United States Patent
Gebauer et al.

(10) Patent No.: US 6,825,937 B1
(45) Date of Patent: Nov. 30, 2004

(54) DEVICE FOR THE CONTACTLESS THREE-DIMENSIONAL MEASUREMENT OF BODIES AND METHOD FOR DETERMINING A CO-ORDINATE SYSTEM FOR MEASURING POINT CO-ORDINATES

(75) Inventors: Dieter Gebauer, Mittweida (DE); Bernhard Steiger, Frankenberg (DE); Rosa Gorzel, Chemnitz (DE); Dieter Auerbach, Mittweida (DE); André Vecsei, Geringswalde (DE); Ralf Straube, Leisnig (DE)

(73) Assignee: MPT Präzisionstelle GmbH, Mittweida (DE)

( * ) Notice: Subject to any disclaimer, the term of this patent is extended or adjusted under 35 U.S.C. 154(b) by 267 days.

(21) Appl. No.: 10/009,862
(22) PCT Filed: Jun. 6, 2000
(86) PCT No.: PCT/DE00/01839
  § 371 (c)(1),
  (2), (4) Date: Jan. 22, 2002
(87) PCT Pub. No.: WO00/77471
  PCT Pub. Date: Dec. 21, 2000

(30) Foreign Application Priority Data

Oct. 6, 1999 (DE) .......................................... 199 26 439
Oct. 6, 1999 (DE) .................................... 299 10 132 U

(51) Int. Cl.[7] ............................................. G01B 11/24
(52) U.S. Cl. ..................................................... 356/602
(58) Field of Search ................................. 356/601–613

(56) References Cited

U.S. PATENT DOCUMENTS 4,089,608 A    5/1978  Hoadley
5,270,560 A   12/1993  Cheng
5,548,405 A    8/1996  Motosugi

FOREIGN PATENT DOCUMENTS

| | | |
|---|---|---|
| DE | 4026942 | 8/1990 |
| DE | 4037383 | 11/1990 |
| DE | 4301538 | 1/1993 |
| DE | 4407518 | 3/1994 |
| DE | 19504126 | 2/1995 |
| DE | 19727227 | 6/1997 |
| DE | 19841235 | 4/1999 |
| EP | 0565357 | 10/1993 |
| GB | 2332056 | 6/1999 |

Primary Examiner—Frank G. Font
Assistant Examiner—Amanda Merlino
(74) Attorney, Agent, or Firm—Horst M. Kasper

(57) ABSTRACT

This invention relates to apparatuses for non-contact three-dimensional measurement of bodies and methods for determining a system of coordinates for measuring points on an apparatus for non-contact three-dimensional measurement of bodies. The apparatus and the method are characterized by particular simplicity and easy implementation. Advantageously, this makes the apparatus and method applicable in production sites for special workpieces. This opens up a wide and highly cost-efficient range of uses. Before the workpieces are measured, a system of coordinates for three-dimensional matching of the workpiece geometry is determined in a first measurement. A body with known dimensions of its edges or lines is placed on any position on the turntable and measured during one rotation using the triangulation sensor. The apparatus according to the invention is thus characterized by its minimal design. The low number of movements required, i.e. one translatory movement of the triangulation sensor and a rotational movement of the turntable, results in determining the outline of a body with a minimal error of measurement.

23 Claims, 3 Drawing Sheets

Figure 1:
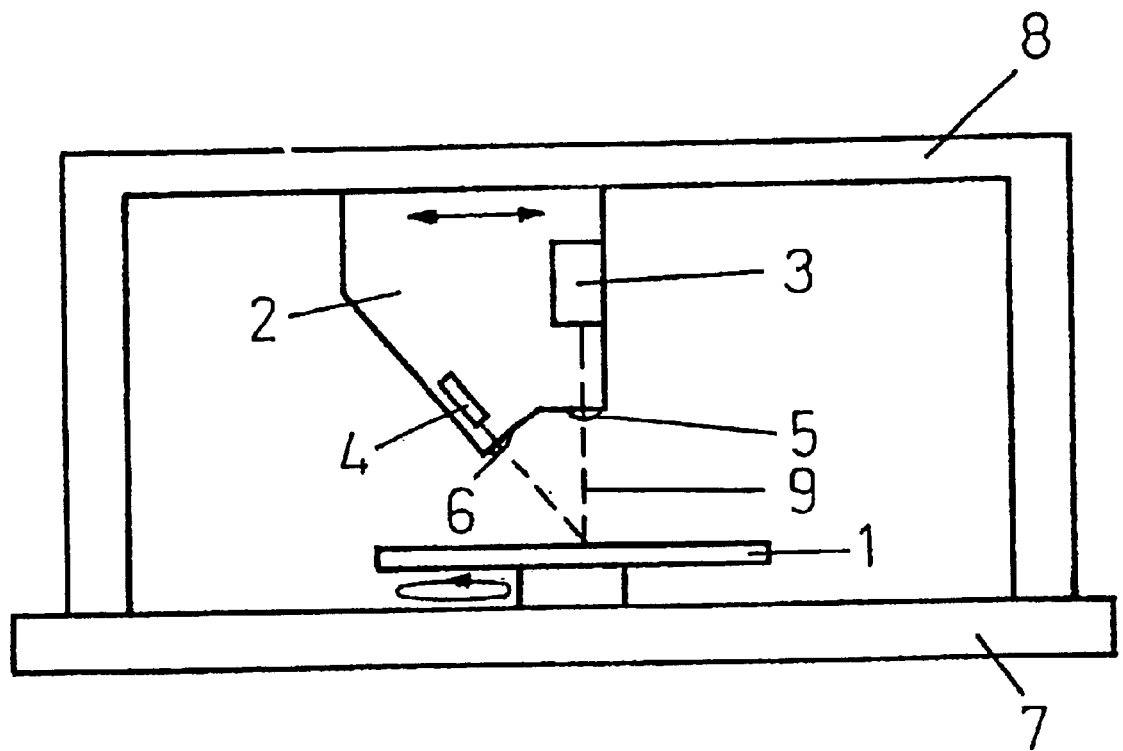

DEVICE FOR THE CONTACTLESS THREE-DIMENSIONAL MEASUREMENT OF BODIES AND METHOD FOR DETERMINING A CO-ORDINATE SYSTEM FOR MEASURING POINT CO-ORDINATES

This application is a 371 of PCT/DE00/01839 filed Jun. 6, 2000.

This invention relates to apparatuses for non-contact three-dimensional measurement of bodies according to the introductory part of claim 1 and methods for determining a system of coordinates for measuring points on an apparatus for non-contact three-dimensional measuring of bodies according to the introductory part of claim 9.

The triangulation method is one of the most common methods used in range and length measurement and two- or three-dimensional contour detection. A triangulation sensor is used, and the beam from a laser diode is focused through a lens on the workpiece. It produces a bright light spot. When this light spot is viewed at a fixed angle using a position detector or camera, the place where the spot is shown moves within the image as soon as the intersecting point of the laser beam and the workpiece are moved relative to the sensor. This displacement is measured to determine the distance of the workpiece or its surface contour when moving perpendicular to the illuminating laser beam.

DE 43 01 538 A1 (Apparatus and arrangement for non-contact three-dimensional measuring, in particular for measuring plaster casts of teeth) uses a turntable on which the body to be measured is placed, a triangulation sensor and a data processing and control unit connected to it to determine the geometry of rounded parts. Measurement is based on either local calibration of each measuring head that must take into account in summary the actual position of measuring surfaces in space by coordinate transformation, or calibration of the entire measuring system using at least one calibrating body where all points in space that are of interest are entered into a joint calibration table. Calibration cannot be avoided.

DE 44 07 518 A1 describes an apparatus and a method for non-contact measurement of three-dimensional objects based on optical triangulation. The triangulation sensor can be moved in one direction (y direction) and pivoted in the x plane across a preset angular position at a fixed point that can be chosen. This involves two independent movements of the triangulation sensor. The object to be measured is located on the turntable. This turntable on the one hand provides rotary movement, on the other hand it can be moved in vertical direction to the movement of the sensor using another driving mechanism. The movements of the triangulation sensor and the turntable determine the coordinates of the measuring spot of the radiation source. Tilting the triangulation sensor allows measuring most dimensions of undercuts, covered points, pocket holes and similar spots of the object. DE 40 37 383 A1 (Method for continuous contactless measurement of outlines and arrangement for carrying out the measuring procedure) uses triangulation to determine the outer contour line of a moving profile. The sensor only detects the distance to the profile and thus its contour. The measuring spot cannot be placed in a system of coordinates.

DE 195 04 126 A1 (Apparatus and method for contactless measurement of three-dimensional objects using optical triangulation), DE 197 27 226 A1 (Set-up of measuring instruments and method for contactless measurement of the three-dimensional spatial shape of a groove in a spectacles frame), and U.S. Pat. No. 5,270,560 (Method and apparatus for measuring workpiece surface topography) record the outlines of workpieces or workpiece parts to be detected step by step. The respective workpiece or workpiece part is only measured relatively.

Coordinate measurement on an object surface is carried out in DE 40 26 942 A1 (Method for contactless measurement of object surfaces) where images are recorded using a camera. This camera is mounted to an index arm of a coordinate gauging device that can be moved in three spatial directions (x and y directions and pivoting). The object to be measured is located on a turntable.

The problem of the invention described in claims 1 and 9 is to provide easy three-dimensional measurement of the geometry of a body and to easily and correctly match triangulation measurement data with the three-dimensional geography of a body.

This problem is solved by the characteristics listed in claims 1 and 9.

The apparatus for non-contact three-dimensional measurement of bodies and the method for determining a system of measuring point coordinates on an apparatus for non-contact three-dimensional measurement of bodies are characterized by particular simplicity and easy implementation. Advantageously, this makes the apparatus and method applicable in production sites for special workpieces. The design is very simple, and the method requires simple and cost-efficient set-up, which ensures a wide range of uses. The basis of the system is an optical triangulation sensor. The beam of a laser diode is focused through a lens on the workpiece. A light spot emerges on the workpiece. This spot is recorded at a fixed angle by a radiation detector. When the workpiece moves relative to the triangulation sensor, the place where the spot is shown also moves within the image. The outline of the workpiece is determined by measuring this displacement.

Before the workpieces are measured, a system of coordinates for three-dimensional matching of the workpiece geometry is determined in a first measurement. A body with known dimensions of its edges or lines is placed on the turntable and measured during one rotation using the triangulation sensor. The body can be placed on the turntable in any position. Instead of said body, lines can be placed onto or into the surface of the turntable.

The triangulation sensor can scan the workpiece by moving the sensor along just one axis and rotating of the workpiece. Controlled triggering of the respective driving mechanisms and use of the system of coordinates results in continuous detection of the workpiece geometry at a high measuring data rate and precision. The apparatus according to the invention is thus characterized by its minimal design. The low number of movements required, i.e. one translatory movement of the triangulation sensor and a rotational movement of the turntable, results in determining the outline of a body with a minimal error of measurement.

Advantageously, the apparatus is particularly suited for measuring rotationally symmetric workpieces. Advantageously, the method can be used to measure rotationally symmetric workpieces. Control and calculation of workpiece geometry is advantageously controlled using a computer.

Preferred embodiments of the invention are described in claims 2 to 8 and 10 to 12.

The surface profile of the workpiece is detected by one perpendicular movement to the illuminating laser beam of the triangulation sensor according to the improvement described in claim 2.

The angle of radiation incidence from the triangulation sensor can be changed using a hinge or ball-and-socket joint according to the improvement described in claim 3. Elevations or recesses in the workpiece surface that might not be found can thus be detected or spotted easier. The coordinate data of the incident radiation can be determined by measuring the angle of the triangulation sensor.

Image distortions on the detector that result in errors of measurement may occur when bodies are measured whose surfaces scatter the radiation from the radiation source by causing multiple reflections. To prevent these errors as much as possible, at least the areas of interest of a body to be measured are covered according to the improvement described in claim 4 with bodies of known thickness whose surfaces are low-scattering with regard to the radiation used. The thickness of these covering bodies is subtracted from the measured value when evaluating the results of measurement so that the original dimension of the body is a corrected measured value.

Favorable variants for determining the system of coordinates for the workpieces according to the improvement described in claim 5 are parallel lines or body edges the distance of which is known. Accordingly designed bodies or bodies comprising such lines are placed on the turntable.

The system of coordinates has to be measured for commissioning and after a change of location only. Thus the bodies for determining the system of coordinates according to the improvement described in claim 6 are required for these measures only.

According to the improvements described in claims 7 and 8, at least two end stops placed at a distance from each other or a magnet incorporated in the turntable are preferred variants of guided workpiece positioning. These positioning aids also largely prevent position changes of the workpieces on the turntable when the turntable is moving. If workpieces are similar in shape, these positioning aids ensure that approximately the same position is retained when changing workpieces. This results in simplified and faster geometry measurement. Thus production monitoring systems can respond faster to any incorrect changes of the manufacturing process.

The illuminating laser beam of the triangulation sensor may be vertically directed towards the turntable surface according to the improvement described in claim 10.

According to the improvement described in claim 11, it is also preferred when determining the system of coordinates for measuring points to use straight or annular lines as parallel lines or body edges.

The system of coordinates has to be measured for commissioning and after a change of location only. Thus the bodies for determining the system of coordinates according to the improvement described in claim 12 are required for these measures only.

Figure 2:
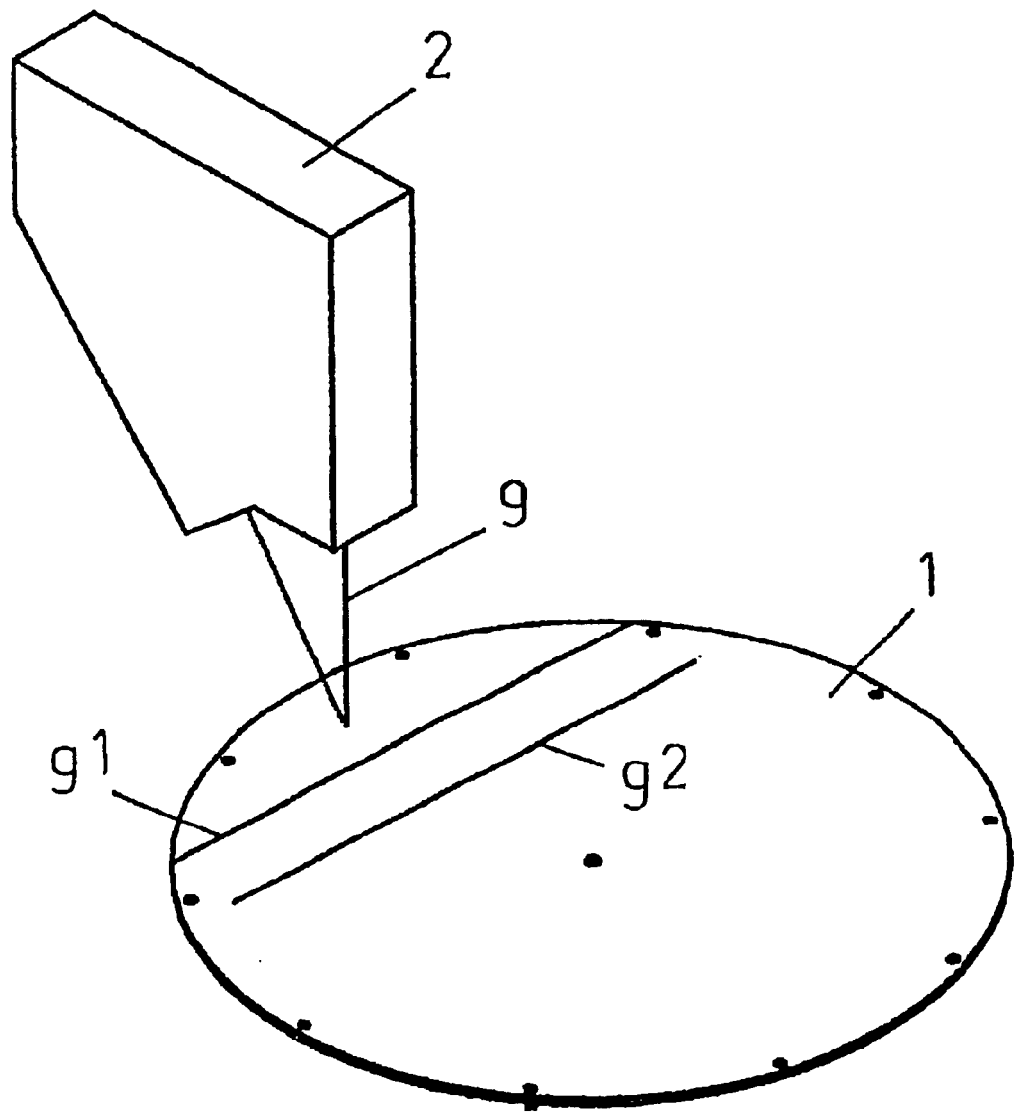
Figure 3:
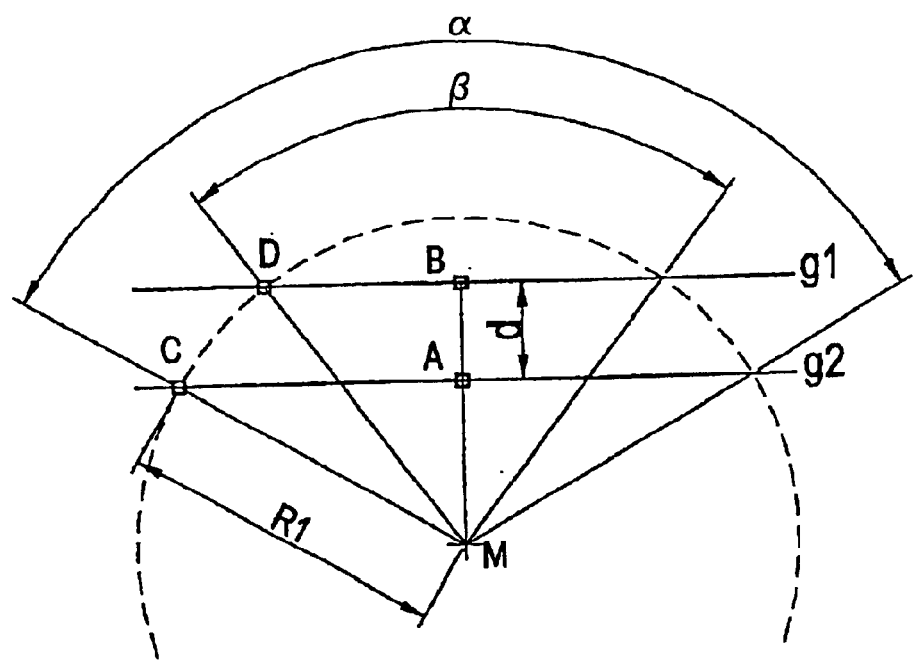
Figure 4:
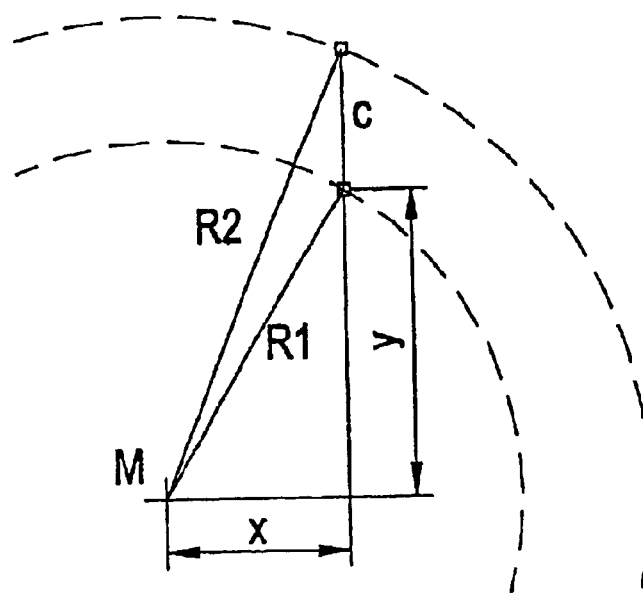

An embodiment of the invention will be explained with reference to FIGS. 1 to 4. Wherein:

FIG. 1 shows a schematic view of an apparatus for non-contact three-dimensional measurement of bodies, FIG. 2 is a schematic view of an apparatus with two lines running in parallel and at a known spacing on the turntable, FIG. 3 and FIG. 4 show the determination of a system of coordinates using two parallel lines or body edges with a known distance from each other, known angles, and a known dislocation of the triangulation sensor.

An apparatus for non-contact three-dimensional measuring of bodies and a method for determining a system of coordinates for measuring points will be explained in greater detail with reference to an embodiment below.

The apparatus for non-contact three-dimensional measurement of bodies consists of a turntable 1 to place the body on and an optical triangulation sensor 2 with at least one radiation source 3, a radiation detector 4, and optical equipment such as a focusing lens 5 and a projection lens 6. The radiation source 3 is a laser diode, and the radiation detector 4 is a monolithic image sensor. A U-shaped frame 8 is mounted on a base plate 7. The turntable 1 is placed on the base plate 7 and centered to the center section of the U-shaped frame 8 (see FIG. 1). The diameter of turntable 1 is smaller than the length of the center section of the U-shaped frame 8. The center section of the U-shaped frame 8 further comprises a guidance into which the triangulation sensor 2 is placed correspondingly. The triangulation sensor 2 can thus be moved across the turntable 1 using a suitable driving mechanism. The driving mechanism is integrated into the center section. The triangulation sensor 2 is placed onto the center section so that the radiation 9 from the radiation source 3 is perpendicular to the turntable 1. The center of the turntable 1 is determined; it marks the point of origin in a system of polar coordinates. This system of coordinates is created for the bodies to be measured during first commissioning and when changing the position of the apparatus.

The turntable 1 comprises several parallel lines (FIGS. 2 and 3), or a measuring body is placed on the turntable 1 to determine the system of coordinates. This measuring body comprises either straight parallel edges or lines for determining a system of coordinates (similar to those shown in FIGS. 2 and 3). These lines or body edges may be placed anywhere on the turntable. The spacing between these straight lines or body edges is known. The turntable makes one full turn while the system of coordinates is determined. During this process, lines g1 and g2 are captured in the measuring spots C and D of the triangulation sensor 2. At the same time, the angles of the measuring spots that coincide with line g1 or line g2 are measured. Trigonometric calculations involving the known distance d=AB between the parallel lines or body edges g1 and g2, the measured angles α and β and the right angle between the straight line MB and the lines g1 and g2 result in the radius R1 and thus the distance between the triangulation sensor 2 and the center of the turntable 1 (shown in FIG. 3).

$$R1 = \frac{d}{\cos\beta/2 - \cos\alpha/2}$$

The distance R2 is determined in the same way as R1 by a displacement c of the triangulation sensor 2 or the turntable 1, and a second rotation of the turntable and measurement of angles α and β (shown in FIG. 4). The direction of the displacement c also defines one direction of the system of coordinates. The coordinates x and y of the system of coordinates are determined using the Pythagorean theorem. In this way, the distance of the center of the turntable 1 from the current position of the triangulation sensor 2 x and y+c are obtained. Now the measuring points of the body can be dimensioned.

$$y = \frac{R2^2 - R1^2 - c^2}{2 \cdot c}$$

$$x = R1^2 - \left(\frac{R2^2 - R1^2 - c^2}{2 \cdot c}\right)^2$$

The measurement can be supported by several circles with different radii that are placed on the turntable 1. These make it easier to allocate dimensions and to position the body on the turntable 1.

The measuring body can be designed as a film with several annular lines. It may remain on the turntable 1 as an adjustment device for the bodies. The film is therefore glued to the top of the turntable 1. The driving mechanisms of the turntable 1 and the triangulation sensor 2 are connected to a computer that controls them. This computer is also used for evaluating the results of measurement. This is why the radiation source 3 and the radiation detector 4 of the triangulation sensor 2 are connected to the computer, too.

Bodies to cover measuring areas of interest can be used if a body to be measured produces scattering such as multiple reflections of the radiation 9 from the radiation source 3. These covering bodies have a known thickness and consist of a material that does not allow excessive multiple reflections. Such covering bodies may consist of ceramics, for example. This allows basically error-free measurement of surface contours even of bodies that have shining surfaces. The turntable 1 may have several end stops or at least one integrated magnet. It is preferred that these end stops on the turntable 1 can be traversed so that bodies with differing geometry can easily be placed in the center of the turntable 1.

In another embodiment, the U-shaped frame 8 is L-shaped and placed in such a way that one of its limbs runs in parallel to, and on top of, the turntable 1. This limb is the guidance for the triangulation sensor 2 (shown in FIG. 2).

We claim:

1. An apparatus for non-contact three-dimensional measurement of bodies consisting of a turntable to receive a body and an optical triangulation sensor with at least one radiation source, radiation detector, and an optical system, characterized in that said triangulation sensor (2) is placed above said turntable (1) and is movable along an axis using a driving mechanism so that radiation from the radiation source hits said body, that said body is located on the turntable (1) in a system of coordinates determined, on the one hand, by at least two parallel lines (g1, g2) or body edges with a known spacing (d) and angles ($\alpha$, $\beta$) of the turntable (1) and, on the other hand, by at least two measuring points at known distances (R1, R2) from a center (M) and known displacement (c) of the triangulation sensor (2) between these measuring points, and that said turntable (1), the driving mechanism and said triangulation sensor (2) are connected to a data processing and control unit.

2. The apparatus according to claim 1, characterized in that said radiation source (3) of said triangulation sensor (2) is placed in such a way that the radiation from the radiation source (3) impinges perpendicular to the surface of said turntable (1).

3. The apparatus according to claim 1, characterized in that said triangulation sensor (2) is placed on a hinge or ball-and-socket joint above said turntable (1) and is movable along an axis using the driving mechanism, and that there is at least one sensor that directly and/or indirectly measures the angle between the radiation (9) and the workpiece.

4. The apparatus according to claim 1, characterized in that at least some areas of the surface of a body that produces excessive scattering in the form of multiple reflections of the radiation (9) from said radiation source (3) are fixedly and/or removably covered by a convering body of known thickness and with low-scattering surface.

5. The apparatus according to claim 1, characterized in that the parallel lines or body edges of a measuring body are straight or annular on said turntable (1).

6. The apparatus according to claim 1, characterized in that a measuring body with at least two edges or a measuring body with at least two lines is placed con said turntable (1) when determining a system of coordinates only.

7. The apparatus according to claim 1, characterized in that said turntable (1) has at least two end stops for bodies placed at a distance from each other.

8. The apparatus according to claim 1, characterized in that at least one magnet is integrated into said turntable (1).

9. A method for determining a system of coordinates for measuring points on an apparatus for non-contact three-dimensional measuring of bodies comprising a turntable (1) to receive said body, an optical triangulation sensor (2) with at least one radiation source (3), radiation detector (4), and an optical system that is placed above said turntable (1) and is movable along an axis using a driving mechanism so that the radiation (9) from said radiation source (3) hits said body, and a data processing and control unit for turntable (1), driving mechanism and triangulation sensor (2), wherein at least two lines (g1, g2) or body edges running in parallel at a known distance (d) are used to determine angles ($\alpha$, $\beta$) of turntable (1) by rotating said lines and subsequently capturing them in the measuring spot of said triangulation sensor (2) in a first and a second position of said triangulation sensor (2) displaced from said first position by the known dislocation c, said angles being used to calculate the distances R1, R2 of said triangulation sensor (2) from the center (M) of said turntable and to further calculate the coordinates x, y of said triangulation sensor (2) relative to the turntable center (M) as coordinates of origin.

10. The method according to claim 9, characterized in that said radiation source (3) of said triangulation sensor (2) is placed in such a way that the radiation from the radiation source (3) is perpendicular to the surface of said turntable (1).

11. The method according to claim 9, characterized in that the parallel lines or body edges of a measuring body are arranged straightly or annularly on said turntable (1).

12. The method according to claim 9, characterized in that a measuring body with at least two edges or a measuring body with at least two lines is placed on said turntable (1) when determining a system of coordinates only.

13. An apparatus for non-contact three-dimensional measurement of bodies comprising a turntable to receive a body;

a radiation source;

a radiation detector;

a driving mechanism;

a data processing and control unit;

an optical system, wherein the radiation source, the radiation detector, and the optical system form an optical triangulation sensor; wherein the triangulation sensor (2) is disposed above said turntable (1) and is movable along an axis using the driving mechanism so that radiation from the radiation source hits said body, wherein said body is located on the turntable (1) in a system of coordinates determined, on the one hand, by at least two parallel lines (g1, g2) or body edges with a known spacing (d) and angles ($\alpha$, $\beta$) of the turntable (1) and, on the other hand, by at least two measuring points at known distances (R1, R2) from a center (M) and known displacement (c) of the triangulation sensor (2) between these measuring points, and that said turntable (1), and wherein the driving mechanism and said triangulation sensor (2) are connected to the data processing and control unit.

14. The apparatus according to claim 13, wherein said radiation source (3) of said triangulation sensor (2) is placed in such a way that the radiation from the radiation source (3) impinges perpendicular to the surface of said turntable (1).

15. The apparatus according to claim 13, further comprising
a hinge or ball-and-socket joint disposed above said turntable (1), wherein said triangulation sensor (2) is placed on the hinge or ball-and-socket joint above said turntable (1) and is movable along an axis using the driving mechanism; and
at least one sensor measuring an angle between the radiation (9) and a workpiece.

16. The apparatus according to claim 13, further comprising
a covering body of known thickness and with low-scattering surfaces, wherein the body is a body producing excessive scattering in the form of multiple reflections of the radiation (9) from said radiation source (3), wherein at least some areas of the surface of the body which produces excessive scattering in the form of multiple reflections of the radiation (9) from said radiation source (3) are fixedly and/or removably covered by the covering body of known thickness and with low-scattering surfaces.

17. The apparatus according to claim 13, wherein the parallel lines or body edges of a measuring body are straight or annular on said turntable (1).

18. The apparatus according to claim 13, wherein a measuring body with at least two edges or a measuring body with at least two lines is placed on said turntable (1) when determining a system of coordinates only.

19. The apparatus according to claim 13, further comprising
at least two stops for bodies disposed at said turntable (1), wherein the at least two end stops for bodies are placed at a distance from each other.

20. The apparatus according to claim 13, further comprising
at least one magnet integrated into said turntable (1).

21. A method for determining a system of coordinates for measuring points on an apparatus for non-contact three-dimensional measuring of bodies comprising
installing a turntable;
receiving a body on the turntable;
placing an optical triangulation sensor (2) including at least one radiation source (3), radiation detector (4), and an optical system above said turntable (1);
moving the triangulation sensor (2) with a driving mechanism along an axis so that the radiation (9) from said radiation source (3) hits said body, and using at least two lines (g1, g2) or body edges running in parallel at a known distance (d) to determine angles ($\alpha$, $\beta$) of turntable (1) by rotating said lines and subsequently capturing them in the measuring spot of said triangulation sensor (2) in a first and a second position of said triangulation sensor (2) displaced from said first position by the known dislocation c in a data processing and control unit for turntable (1), driving mechanism and triangulation sensor (2); and
using said angles to calculate the distances R1, R2 of said triangulation sensor (2) from a center (M) of said turntable and to further calculate the coordinates x, y of said triangulation sensor (2) relative to a turntable center (M) as coordinates of origin in the data processing and control unit for turntable (1), driving mechanism and triangulation sensor (2).

22. The method according to claim 21, further comprising
placing said radiation source (3) of said triangulation sensor (2) in such a way that the radiation from the radiation source (3) is perpendicular to the surface of said turntable (1).

23. The method according to claim 21, further comprising
placing a measuring body with at least two edges or a measuring body with at least two lines on said turntable (1) only during a determining of a system of coordinates.

* * * * *